Figure 5:
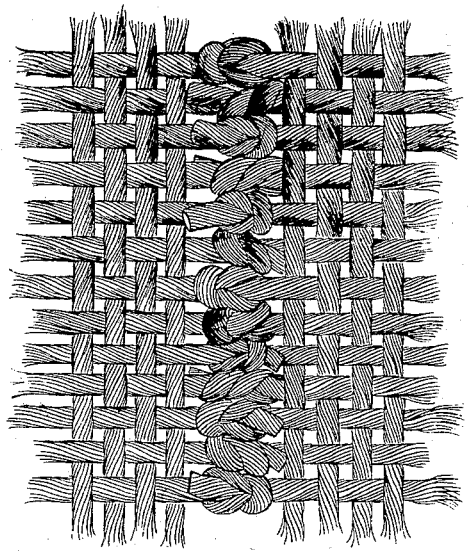

No. 696,830. Patented Apr. 1, 1902.
D. MARGOLIUS.
PROCESS OF MAKING REPAIRED FABRICS.
(Application filed Nov. 8, 1901.)
(No Model.) 2 Sheets—Sheet 1.
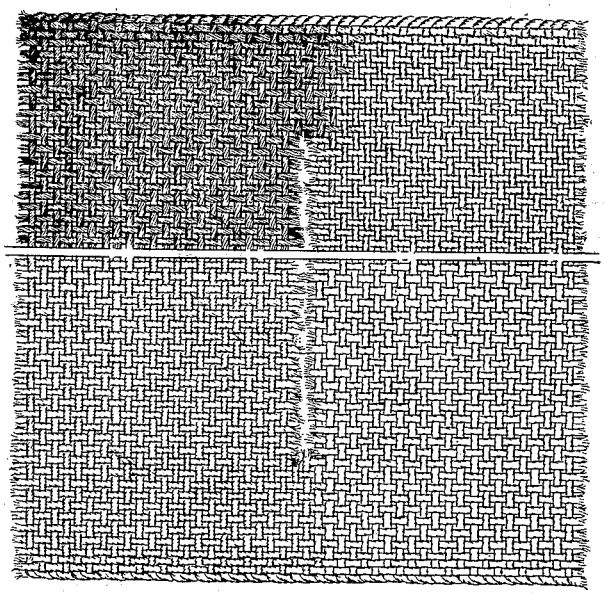
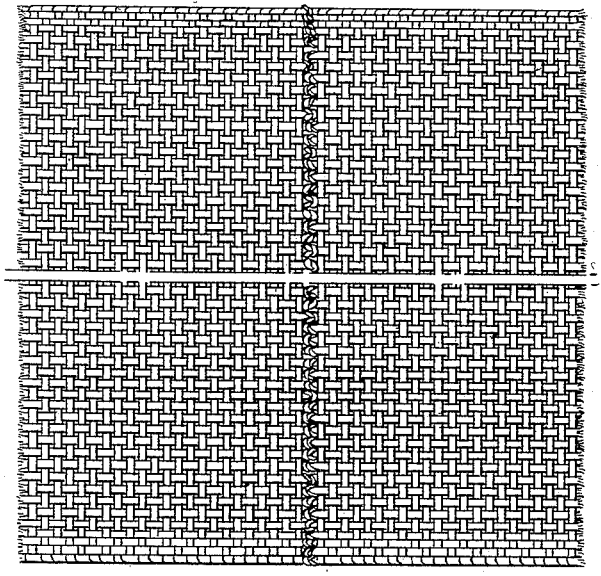
WITNESSES:
INVENTOR
David Margolius
BY
ATTORNEYS No. 696,830. Patented Apr. 1, 1902.
D. MARGOLIUS.
PROCESS OF MAKING REPAIRED FABRICS.
(Application filed Nov. 8, 1901.)
(No Model.) 2 Sheets—Sheet 2.

I  II  III

WITNESSES:

INVENTOR
David Margolius
BY
ATTORNEYS

United States Patent Office.

DAVID MARGOLIUS, OF NORFOLK, VIRGINIA, ASSIGNOR OF ONE-HALF TO RAPHAEL MARGOLIUS, OF NORFOLK, VIRGINIA.

PROCESS OF MAKING REPAIRED FABRICS.

SPECIFICATION forming part of Letters Patent No. 696,830, dated April 1, 1902.

Application filed November 8, 1901. Serial No. 81,572. (No specimens.)

*To all whom it may concern:*

Be it known that I, DAVID MARGOLIUS, a citizen of the United States, and a resident of Norfolk, in the county of Norfolk and State of Virginia, have invented a new and Improved Process of Making Repaired Fabrics, of which the following is a full, clear, and exact description.

This invention relates specifically to a means for repairing the rough bagging or jute fabric used for covering bales of cotton. It is the ordinary and long-established custom in the Southern States of this country to cover bales of cotton with this coarse jute bagging or fabric. This material is usually supplied to the planter in long lengths—say of fifty yards each—and these lengths are cut up into small pieces to suit the size of the cotton-bale. The bale is then sent to market, and when it is sampled a knife is thrust through the bagging and into the bale, so that a sample of the cotton from the interior of the bale may be withdrawn. This done the bale of cotton goes to the mill to be manufactured, and the bagging in which the bale was inclosed has generally been thrown away and totally lost or used for the manufacture of paper. On some occasions the mutilated bagging has been patched up with twine and needle and used again in the effort to avoid the total loss of the bagging. This process is not very advantageous, however, since the patch must necessarily make the bagging very cumbersome and weak at the patched point.

My invention seeks to provide a method of effectually repairing the fabric thus mutilated, so that it may be resold to the planters and furnish a bagging which in practice is just as good as when originally used. This end I attain by taking the separate pieces of bagging, in each of which is a cut or stab produced in the sampling operation, and continuing this cut or stab along to the edges of the section of bagging, thus dividing such section into two disconnected parts. I next take these two separate parts and join them by knotting together the severed threads, the knots being closely tied, so that the two parts of the fabric are joined together, making a practically-continuous fabric having almost the same regularity as when originally woven. In order to make the fabric into long lengths suitable for use according to the ordinary customs of cotton-planters, the several sections of bagging patched together as above described are themselves joined together by tying together the adjacent threads.

This specification is a specific description of the manner of carrying out the invention, while the claim is a definition of the actual scope thereof.

Reference is to be had to the accompanying drawings, forming a part of this specification, in which similar characters of reference indicate corresponding parts in all the figures.

Figure 1 is a broken view showing a section of fabric with the stab or cut therein which is produced during the sampling of the cotton. Fig. 2 is a similar view showing a section of the bagging repaired according to my invention. Fig. 3 is an enlarged view showing the manner of knotting together the matching threads of the fabric, and Fig. 4 is a diagrammatic view illustrating the various steps in the progress of the process.

Figure 4:
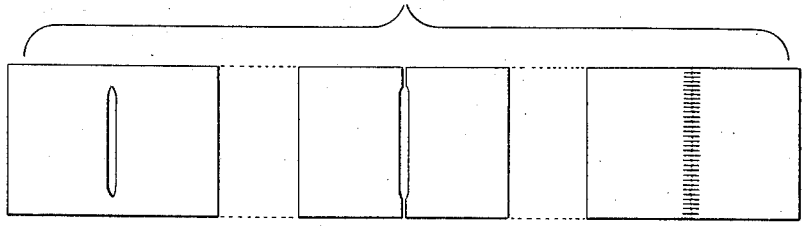

Referring to Fig. 4, the Roman numeral I represents a section of bagging with the stab or cut therein, in which form such section of bagging is found after the cotton is taken out. In carrying out my invention I take the section of bagging, as indicated at the numeral I, and form additional cuts leading from the ends of the original cuts to the adjacent edges of the fabric, as indicated by the numeral II. This, it will be observed, forms the fabric into two disconnected pieces. These pieces are now joined to each other by knotting together the matching ends of the warp-threads, producing a continuous section of fabric, as indicated at III in Fig. 4. Fig. 3 shows in an enlarged view the manner of knotting these threads together. Fig. 2 shows the general appearance of the fabric when completely repaired, and it will be seen that the knotted ends extend completely across the fabric from one edge to the other and that all the warp-threads are knotted together.

The purpose of dividing the section of fabric into two sections, as indicated at II in Fig. 4, is to permit evenly joining together the two threads, and thus to produce the repaired fabric with a regular and symmetrical form as contradistinguished from a bulged or cumbersome form, as would otherwise occur—as, for example, in the above-referred-to practice of patching up the cut. To facilitate the tying of the warp-threads, one or more of the weft-threads may be removed at the cut.

In the practical employment of my process after two separate sections of fabric (see the numeral II in Fig. 4) are joined together (producing the section shown by the Roman numeral III in Fig. 4) I may take these repaired sections and join them to each other in the same manner—that is to say, by knotting together the warp-threads—thus producing a long length of fabric, which is substantially the same as the long length of fabric originally manufactured. This length of repaired fabric may then be sold to the planter and used by him with exactly the same results as the fabric when originally manufactured.

It will be observed that my invention involves a great saving of material, since it enables me to transform into bagging practically as good as new the old scraps, which otherwise would at best be ground up into pulp for paper manufacture.

Having thus described my invention, I claim as new and desire to secure by Letters Patent—

The method of repairing fabrics which have stabs or cuts produced therein inside of their margins or edges, which method consists first in extending the stabs or cuts from each end completely out to the adjacent margins of the fabric, and then in connecting together the matching ends of the threads of the fabric which have been severed.

In testimony whereof I have signed my name to this specification in the presence of two subscribing witnesses.

DAVID MARGOLIUS.

Witnesses:
A. L. HARWELL,
J. M. MARSHALL.